United States Patent [19]

Wright et al.

[11] Patent Number: 5,507,266
[45] Date of Patent: Apr. 16, 1996

[54] FUEL PRESSURE CONTROL USING HYSTERESIS PUMP DRIVE

[75] Inventors: Danny O. Wright; Russell J. Wakeman, both of Newport News, Va.

[73] Assignee: Siemens Automotive L.P., Auburn Hills, Mich.

[21] Appl. No.: 226,146

[22] Filed: Apr. 11, 1994

[51] Int. Cl.⁶ ................................. F02M 37/04
[52] U.S. Cl. ................ 123/497; 123/456; 417/214
[58] Field of Search ................ 123/497, 456, 123/494, 446; 417/214

[56] References Cited

U.S. PATENT DOCUMENTS

| | | | |
|---|---|---|---|
| 3,985,468 | 10/1976 | Lewis | 417/214 |
| 4,800,859 | 1/1989 | Sagisaka | 123/497 |
| 4,827,897 | 5/1989 | Yamada | 123/497 |
| 5,133,323 | 7/1992 | Treusch | 123/497 |
| 5,233,944 | 8/1993 | Mochizuchi | 123/497 |
| 5,237,975 | 8/1993 | Betki | 123/497 |

Primary Examiner—Carl S. Miller
Attorney, Agent, or Firm—Russel C. Wells

[57] ABSTRACT

Fuel pressure in a deadheaded fuel rail is regulated by an eddy current clutch that forms part of the mechanism that mechanically couples the engine crankshaft with a fuel pump which delivers pressurized fuel to the rail. An electric control that receives several inputs, including engine speed and fuel rail pressure, controls the degree of coupling that is provided by the clutch so that the pressure is regulated even though the engine speed and fuel demand change during normal engine operation.

14 Claims, 3 Drawing Sheets

FUEL PRESSURE CONTROL USING HYSTERESIS PUMP DRIVE

FIELD OF THE INVENTION

This invention relates generally to internal combustion engines having fuel injection systems, particularly a fuel injection system of the type in which electrically operated fuel injectors are served with pressurized liquid fuel from a common fuel rail and the pressure in the fuel rail is created by a pump that is mechanically coupled in driven relation to the engine's crankshaft.

BACKGROUND AND SUMMARY OF THE INVENTION

High pressure gasoline injection systems having a common rail fuel that serves pressurized fuel to the fuel injectors typically require the use of a positive displacement pump of the swashplate or cam ring type in order to obtain the necessary fuel pressure, typically 30–150 bar. Various considerations usually dictate that the pump be engine-mounted and driven mechanically from one of the engine's accessory drives. This pump configuration enables the system to provide proper atomization and fuel delivery rates for the purpose of direct injection into the combustion chamber. The common rail approach implies that the pump in the system maintain system pressure regardless of engine speed or load for proper function of the injection system. Since it is difficult to maintain this fuel pressure accurately by use of the pump alone, some sort of fuel pressure regulation must be included in the system.

Traditional gasoline injection systems operating at low pressure use a regulator with a spring and diaphragm arrangement to sense the pressure and return enough fuel from the rail to the tank to maintain a pressure setpoint that is a function of diaphragm area and spring rate. This is not a practical design in a high pressure system because the diaphragm will not endure the high fuel pressures. An electronic equivalent of the spring and diaphragm arrangement is a regulator where the pressure is sensed by an electronic transducer, and an electronic controller uses this pressure information to command a solenoid valve to bleed fuel out of the rail and back to the tank in an amount that regulates the fuel pressure to the established setpoint. That type of electronically controlled fuel pressure regulation has the advantage of variability which allows the engine controller to establish a particular setpoint pressure for a particular engine operating point and then change that pressure setpoint in a fashion appropriate to changes in the engine operating point. A form of such electronically controlled fuel pressure regulation continues to be successfully used in the assignee's high pressure fuel injection system, although it is recognized that although the amount of fuel pumping work performed at high pressure does not represent optimum efficiency.

Since the energy input to any pump can be no less than the product of pump outlet pressure and flow rate, pumping work goes up dramatically when the pressure is raised by the factor of 25, as it typically is in a high pressure system compared to a low-pressure system. This added pumping work consumes power directly from the engine, thus reducing engine flywheel power and increasing fuel consumption. In addition, since the pump must be sized large enough to supply the engine with fuel at the highest speeds and loads, a great deal of fuel is returned to the tank by the pressure regulator at low engine demands. Although the power that is used to pressurize the return fuel obviously detracts from engine flywheel horsepower, an inherent side effect is that the lost power appears as waste heat in the return fuel. Since the return fuel conduit is also exposed to engine heat, a fuel system that requires a fuel return from the fuel rail to the tank can raise the temperature of gasoline in the tank to a point where the heat from the return fuel contributes to the creation of fuel vapors and hence increases the loading on the evaporative emission control system, as the fuel in the tank is gradually heated by continued operation of the vehicle. If unacceptable evaporative emission control system performance results, the only solution may be to increase its capacity, which naturally would impose added cost on the automotive vehicle.

The present invention relates to an alternative for regulating the fuel pressure in the fuel rail which does not use a return to the fuel tank and hence does not return heated fuel to the tank. This type of a system is sometimes referred to as a "returnless" or a "deadheaded" system. The system of the present invention uses a variable drive for the fuel pump to regulate fuel pressure in the fuel rail without returning fuel to the tank. Fuel pressure in such a deadheaded fuel is controlled by varying the output of the pump. When the pump is a positive displacement type, this control occurs by decoupling pump speed from engine speed.

Most drive coupling mechanisms that are capable of this speed control have problems that make them unacceptable in automotive use. Gear drives are expensive, complex, and lack reliability. Fluid systems are complex and bulky. Variable belt drives are difficult to control electronically. Friction clutches have severe durability problems.

The drive coupling mechanism proposed here is a hysteresis (eddy current) magnetic clutch. These devices consist of a field coil which is arranged to direct lines of flux through a magnet drive rotor and a magnetic driven rotor in order to transmit torque by magnetic coupling between the two rotors. Properly designed, these clutches transmit torque which is proportional to the current which is driven through the field coil. These clutches have the advantages of no wear surfaces, compact packaging, electronic control with relatively low energy consumption, and a minimal number of moving parts. Since the parameter of interest is the power being transmitted to the pump, varying current to control torque transmitted to the pump enables a control system to be developed which varies pressure on command from an electronic module. The input shaft of the clutch is driven by either gears or belts from the engine crankshaft (existing accessory drives are a good candidate for this drive) and the output shaft of the clutch directly drives the pump input shaft. A compact package for such a clutch mechanism integrally contains both the clutch input and output shafts.

The control system for controlling the clutch comprises a pressure sensor, or transducer, for sensing fuel rail pressure, an electronic control module having the pressure sensor in a feedback loop, and other inputs representing engine speed, air/fuel ratio setpoint, and a desired fuel pressure setpoint. A control algorithm is embodied in a P.I.D. loop calibrated to match the feedback from the pressure sensor to the pressure setpoint transmitted by the engine controller. This pressure setpoint is calibrated in the engine controller to suit the engine operating point and the fuel injector characteristics. (Typically, a fixed pressure is the simplest control algorithm, but a variable pressure can be used to extend the dynamic range and thereby provide the opportunity to vary the spray patterns of the injectors to suit the operating conditions in the engine's combustion chambers.) Other inputs to the controller include engine speed (to allow the controller to compensate for changes in clutch input speed and still maintain pressure regulation) and air/fuel ratio setpoint (to allow anticipation of changes in required pump outflow as injector flow is changed at a constant engine speed). An output (actual rail pressure) from the pressure controller to the engine controller allows compensation of the injector pulse width for conditions where the controller is unable to maintain the required setpoint, such as during cranking when the electrical system voltage is low, and engine speed is too low to maintain pump performance.

Other clutch forms which also possess a characteristic wherein the amount of slippage between the input and the output shafts is established by the magnitude of an electrical input control current delivered to the clutch include magnetic particle clutches and electrorheological fluid clutches. The magnetic particle clutch uses fine magnetic powder between a driving and a driven plate. A coil applies a magnetic field to the powder. Torque is transmitted by the shearing of the powder, and the resistance to shearing is proportional to the current flowing in the coil. Here again, the advantages are simplicity, electronic control, small package, and freedom from wearing. Electrorheological (ER) fluid clutches are constructed with driving and a driven vanes, and the spaces between the vanes are filled with ER fluid. The ER fluid has the property of fluid shear stress that is proportional to the voltage applied across the plates, and torque is transmitted by the shear stress. This clutch too has small packaging, electronic control, freedom from wear, and simplicity in its favor.

The foregoing, along with additional features and advantages of the invention, will be seen in the ensuing description and claims that are accompanied by drawings illustrating a presently preferred embodiment according to the best mode contemplated at this time in carrying out the invention.

DESCRIPTION OF THE PREFERRED EMBODIMENT

Figure 1:
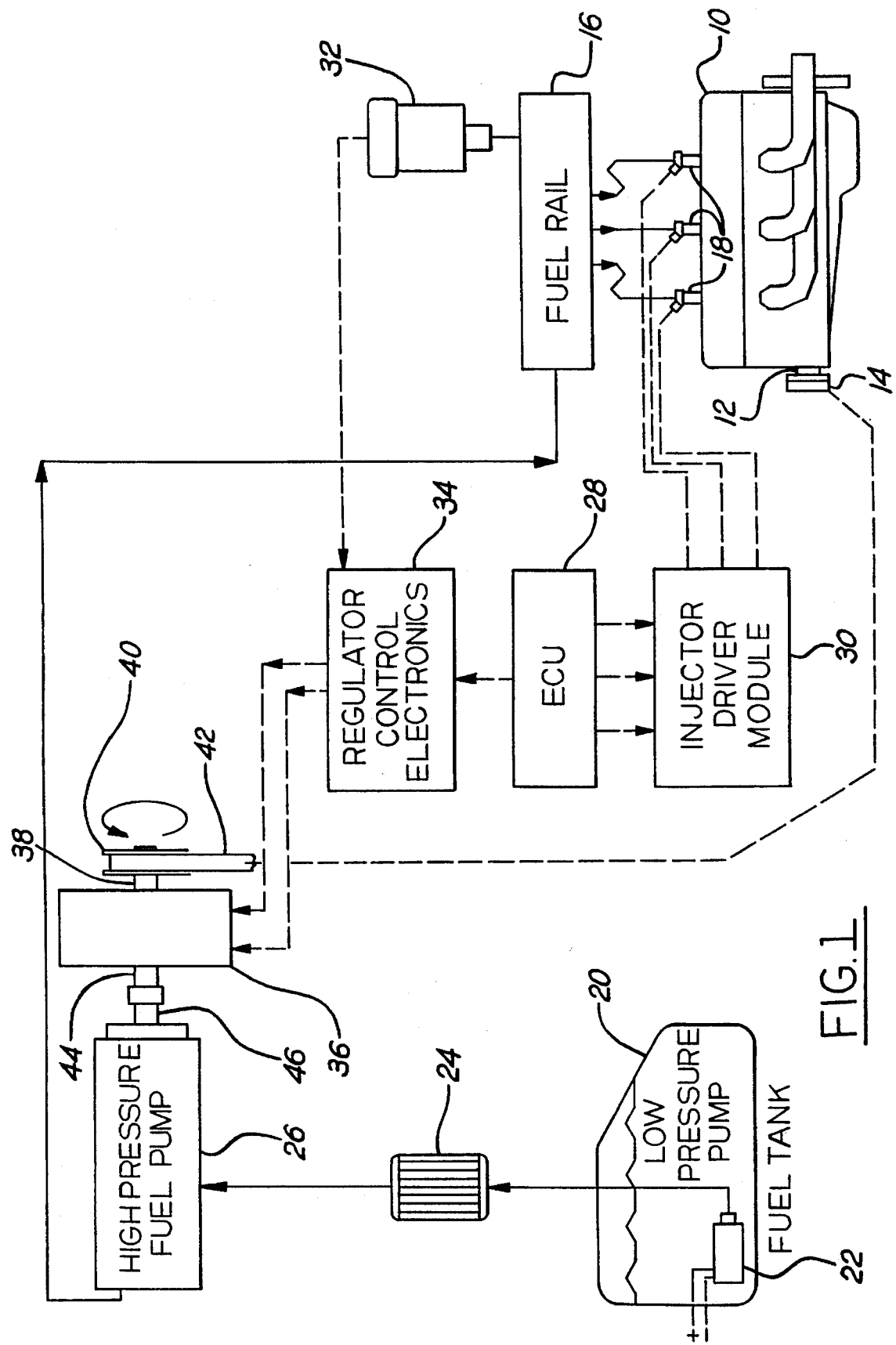
FIG. 1 is a schematic block diagram of an exemplary engine and high pressure fuel system in accordance with principles of the invention.

FIG. 1 shows an exemplary embodiment of the general organization and arrangement of the inventive system which comprises an internal combustion engine 10 having a crankshaft 12 on an exterior end of which is a disk 14, such as a sheave or wheel, via which various accessory devices are driven from the crankshaft as the engine operates. The engine's fuel system comprises a fuel rail 16 that is common to a number of electrically operated fuel injectors 18, each of which is disposed to inject gasoline directly into a corresponding engine combustion chamber space (direct cylinder injection). Gasoline is stored in a fuel tank 20 and delivered to fuel rail 16 through a fuel supply means that includes an in-tank, low pressure fuel pump 22, a fuel filter 24, and a high-pressure fuel pump 26. An electronic control unit (ECU) 28 receives various input signals (these signals are shown only in FIG. 2) and in turn acts through an injector driver module 30 to operate fuel injectors 18. A pressure transducer 32 is disposed to sense fuel pressure in fuel rail 16 and supply a fuel pressure signal representing that pressure to an electric control that is designated regulator control electronics 34. Regulator control electronics 34 also receives an input signal from ECU 28. In accordance with these two input signals to it, regulator control electronics 34 delivers a corresponding control current to a hysteresis (eddy current) magnetic clutch 36 that forms a portion of the mechanism by which pump 26 is mechanically coupled in driven relationship with crankshaft 12. Clutch 36 comprises an input shaft 38 driven disk, such as a wheel or containing a sheave 40. An endless drive member 42 couples disk 40 with disk 14 to cause clutch input shaft 38 to be rotated by crankshaft 12 when the latter rotates. Clutch 36 further comprises an output shaft 44 that is direct-coupled to a shaft 46 of pump 26.

Figure 3:
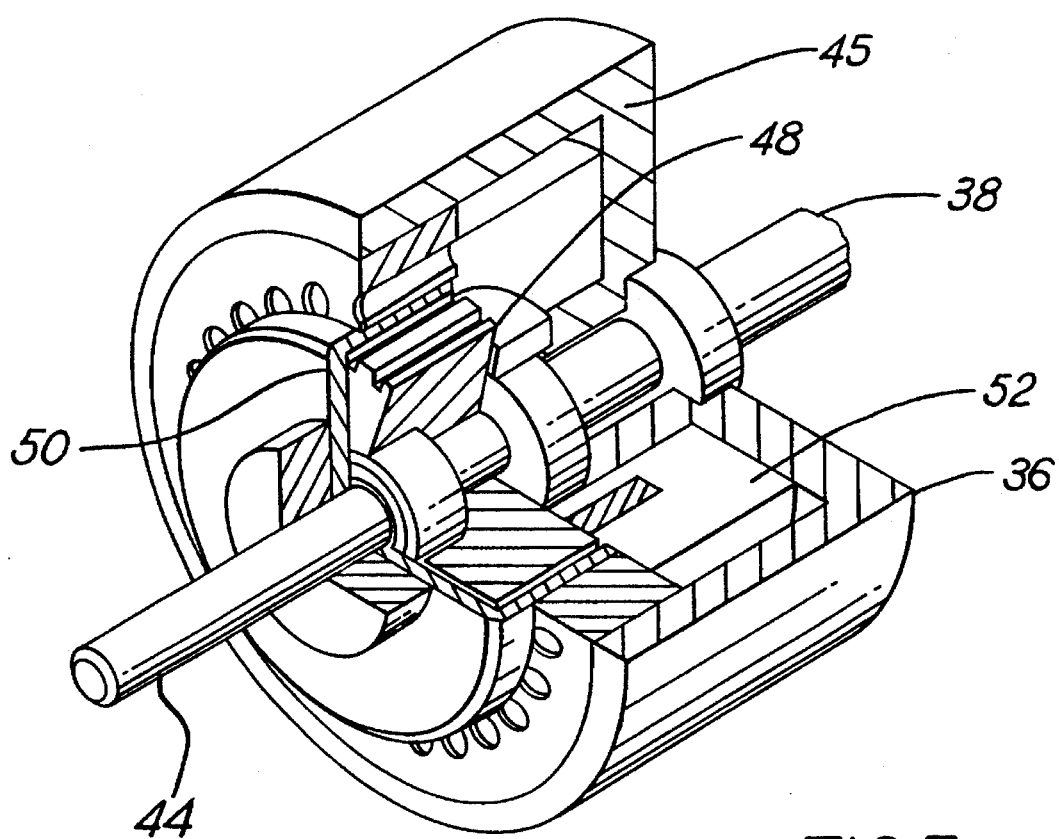
FIG. 3 is a perspective view, partly in section, of a representative hysteresis (eddy current) magnetic clutch that is used in the fuel system.

FIG. 3 shows some detail of a specific clutch 36. It comprises a generally cylindrical housing 45 on which shafts 38 and 44 are independently, but coaxially, journaled by means of several internal bearings. Input shaft 38 comprises an input rotor 48, and output shaft 44 comprises an output rotor 50. A coil 52 controls the degree of magnetic coupling between the two rotors, based on the magnitude of current that flows through the coil. In other words, the extent to which power can flow through the clutch from input shaft 38 to output shaft 44 is controlled by the amount of current flowing in coil 52.

Figure 2:
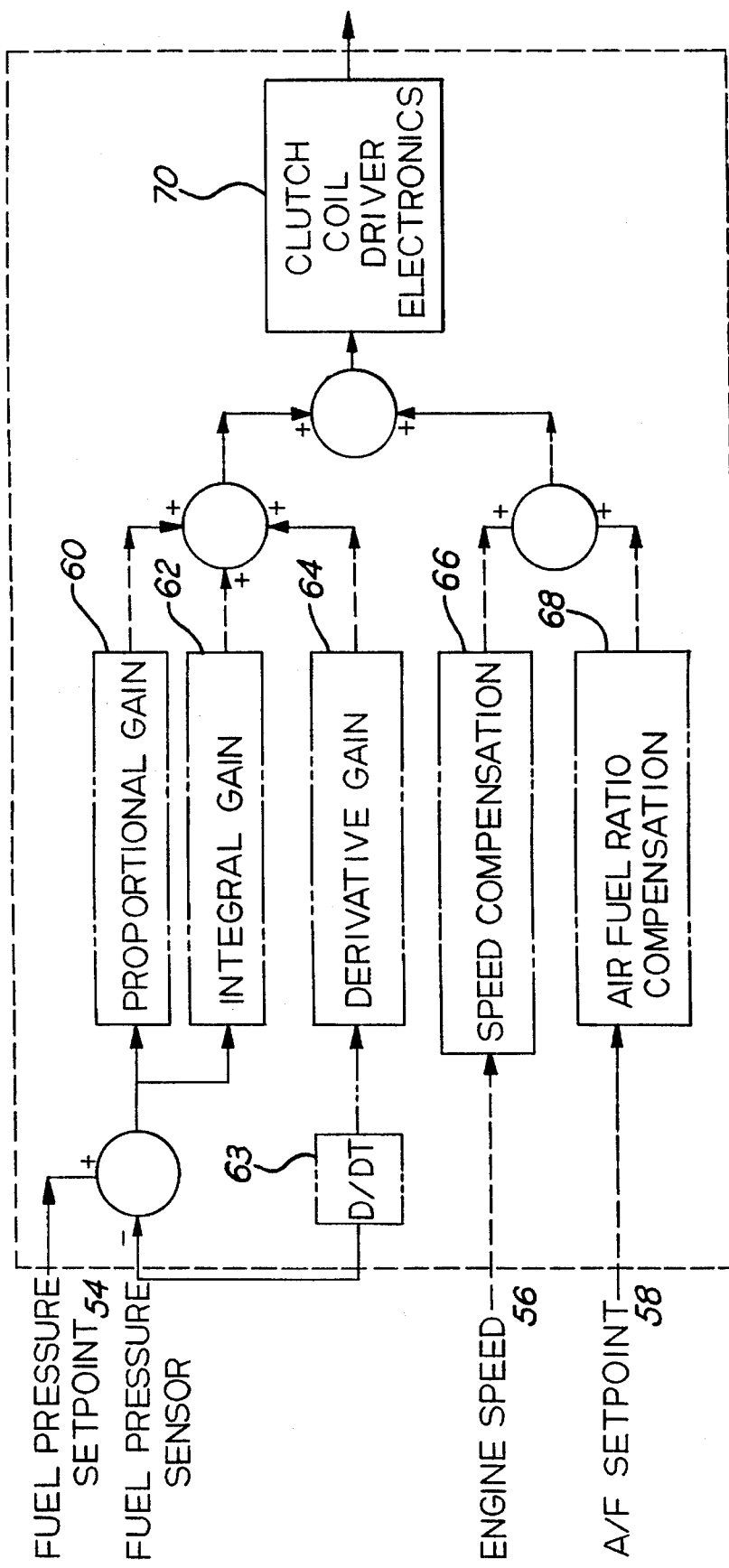
FIG. 2 is a more detailed schematic block diagram of a portion of FIG. 1.

In the system of FIG. 1 therefore, clutch 36 functions to cause pump 26 to operate in a manner that regulates the fuel pressure in fuel rail 16 to a desired fuel pressure even though engine fuel consumption and engine speed are subject to a wide range of changes in normal operation of the engine in an automotive vehicle. The ability to accomplish the best possible pressure regulation depends on the capability of electrical and electronic portions of the system, including various transducers, and on the control strategy employed. FIG. 2 depicts detail of an embodiment of regulator control electronics 34 that is well-suited for accomplishing acceptable operation of clutch 36.

The fuel pressure signal input from pressure transducer 32 to regulator control electronics 34 was previously discussed. Additional inputs, not previously discussed in detail, are: a fuel pressure setpoint 54, engine speed 56, and an air/fuel (NF) setpoint 58. The engine speed is obtained from any suitable source, such as a crankshaft speed sensor. The fuel pressure sensor signal from transducer 32 is subtracted from the fuel pressure setpoint signal 54, and the difference is applied as an input to both a proportional gain stage 60 and an integral gain stage 62. The first derivative of the fuel pressure sensor signal is obtained at a differentiator 63 and applied as an input to a derivative gain stage 64. The engine speed signal 56 is applied as an input to a speed compensation stage 66, and the A/F setpoint signal 58 is applied as an input to an air-fuel ratio compensation stage 68. Stages 60, 62, and 64, in conjunction with differentiator 63 constitute a PID (proportional, integral, derivative) function generator that may be described generally as performing a PID function on the fuel pressure signal from transducer 32. The outputs of the stages 60, 62, 64, 66, and 68 are summed together to form a composite signal that is applied to a clutch coil driver electronics stage 70 that drives coil 52 with current corresponding to the composite signal. The speed compensation and air-fuel ratio compensation stages 66, 68 function as feed forward stages for quickly adjusting the degree of clutch coupling during changing engine speed and changing A/F setpoint. The various stages 60, 62, 64, 66, 68 could possibly receive other input signals that are used to adjust their transfer functions, such as certain signals from an engine management computer.

Figure 4:
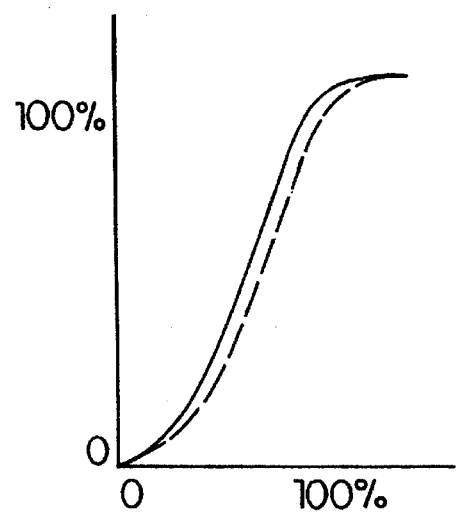
FIG. 4 is a graph plot useful in explaining certain operating principles.

The term "hysteresis" has been used above at times when referring to a clutch. Because a magnetic coupling effect is involved, such a clutch inherently possesses a hysteresis characteristic, such as shown in FIG. 4. It is to be appreciated that good design practice will take this into account so that its presence will have no, or at most minimal, effect.

While a presently preferred embodiment of the invention has been illustrated and described, it should be appreciated that principles are applicable to other embodiments that fall within the scope of the following claims.

What is claimed is:

1. In an automotive vehicle engine having a crankshaft and a fuel injection system with a fuel rail having at least one electrically operated fuel injector for injecting fuel into the engine, a fuel tank for holding liquid fuel, fuel supply means for supplying liquid fuel from the tank to the fuel rail to create pressurized fuel in the fuel rail for the at least one fuel injector, a pressure transducer for sensing the pressure of the pressurized fuel in the fuel rail and generating a pressurized fuel control signal in response thereto, a system for maintaining fuel pressure control comprising:

a pump that is mechanically coupled in driven relation to the engine crankshaft;

an electric control responsive to various electric signals including said pressurized fuel control signal for generating a pump control signal for controlling the operation of said pump as a function of said various electric signals for maintaining a desired fuel pressure in the fuel rail irrespective of variations in engine speed and torque as the engine operates; and an electrically-controlled clutch for connecting said pump to the engine crankshaft, said clutch being controlled in accordance with said pump control signal for maintaining said desired fuel pressure in the fuel rail by the extent to which said pump control signal allows power to be transmitted from the engine crankshaft through said clutch to said pump.

2. In an automotive vehicle engine having a crankshaft and a fuel injection system with a fuel rail having at least one electrically operated fuel injector for injecting fuel into the engine, a fuel tank for holding liquid fuel, fuel supply means for supplying liquid fuel from the tank to the fuel rail to create pressurized fuel in the fuel rail for the at least one fuel injector, a pressure transducer for sensing the pressure of the pressurized fuel in the fuel rail and generating a pressurized fuel control signal in response thereto, a system for maintaining fuel pressure control in a returnless fuel system comprising:

a pump that is mechanically coupled in driven relation to the engine crankshaft;

an electric control responsive to various electric signals including said pressurized fuel control signal for generating a pump control signal for controlling the operation of said pump as a function of said various electric signals for maintaining a desired fuel pressure in the fuel rail irrespective of variations in engine speed and torque as the engine operates without returning fuel from the fuel rail to the fuel tank; and an electrically-controlled clutch for connecting said pump to the engine crankshaft, said clutch being controlled in accordance with said pump control signal for maintaining said desired fuel pressure in the fuel rail by the extent to which said pump control signal allows power to be transmitted from the engine crankshaft through said clutch to said pump.

3. A system for maintaining fuel pressure control in an automotive vehicle engine as set forth in claim 1 in which said various electric signals include a crankshaft rotational speed signal obtained from a speed sensor that is disposed to sense crankshaft speed.

4. A system for maintaining fuel pressure control in an automotive vehicle engine as set forth in claim 3 in which said output signal of said electric control is a composite signal that is created in said electric control, and one component of said composite signal is created by a means in said electric control for performing a PID function on the fuel pressure signal to create a signal that forms said one component of said composite signal.

5. A system for maintaining fuel pressure control in an automotive vehicle engine as set forth in claim 4 in which said electric control comprises means for performing a compensation function on said crankshaft rotational speed signal to create a compensated crankshaft speed signal that is used to form another component of said composite signal.

6. A system for maintaining fuel pressure control in an automotive vehicle engine as set forth in claim 5 in which said electric control comprises means for performing a compensation function on an A/F setpoint signal representing an air/fuel ratio to create a compensated air/fuel ratio signal that is used to form a further component of said composite signal.

7. A system for maintaining fuel pressure control in an automotive vehicle engine as set forth in claim 3 in which said various electric signals include an A/F setpoint signal representing an air/fuel ratio and a fuel pressure setpoint signal representing a fuel pressure, and said electric control comprises first compensation stage means responsive to said crankshaft rotational speed signal for generating a speed compensation signal;

second compensation stage means responsive to said A/F set point signal for generating an air-fuel compensation signal;

means for taking the difference between said fuel pressure setpoint signal and the fuel pressure signal of the fuel pressure transducer and supplying such difference to both a proportional gain stage and an integral gain stage of said electric control, means for taking the first derivative of the fuel pressure signal from the transducer and supplying such first derivative to a derivative gain stage of said electric control, and means for adding output signals from said gain stages and said compensation stages to form a composite pump control signal operating said clutch.

8. A system for maintaining fuel pressure control in an automotive vehicle engine as set forth in claim 1 in which said clutch is an eddy current type clutch to which a control current corresponding to said output signal of said electric control is delivered to control the extent to which the clutch is allowed to slip.

9. A system for maintaining fuel pressure control in an automotive vehicle engine as set forth in claim 2 in which said various electric signals include a crankshaft rotational speed signal obtained from a speed sensor that is disposed to sense crankshaft speed.

10. A system for maintaining fuel pressure control in an automotive vehicle engine as set forth in claim 9 in which said output signal of said electric control is a composite signal that is created in said electric control, and one component of said composite signal is created by a means in said electric control for performing a PID function on the fuel pressure signal to create a signal that forms said one component of said composite signal.

11. A system for maintaining fuel pressure control in an automotive vehicle engine as set forth in claim 10 in which said electric control comprises means for performing a compensation function on said crankshaft rotational speed signal to create a compensated crankshaft speed signal that is used to form another component of said composite signal.

12. A system for maintaining fuel pressure control in an automotive vehicle engine as set forth in claim 11 in which said electric control comprises means for performing a compensation function on an A/F setpoint signal representing an air/fuel ratio to create a compensated air/fuel ratio signal that is used to form a further component of said composite signal.

13. A system for maintaining fuel pressure control in an automotive vehicle engine as set forth in claim 9 in which said various electric signals include an A/F setpoint signal representing an air/fuel ratio and a fuel pressure setpoint signal representing a fuel pressure, and said electric control comprises first compensation stage means responsive to said crankshaft rotational speed signal for generating a speed compensation signal;

second compensation stage means responsive to said A/F set point signal for generating an air-fuel compensation signal;

means for taking the difference between said fuel pressure setpoint signal and the fuel pressure signal of the fuel pressure transducer and supplying such difference to both a proportional gain stage and an integral gain stage of said electric control, means for taking the first derivative of the fuel pressure signal from the transducer and supplying such first derivative to a derivative gain stage of said electric control, and means for adding output signals from said gain stages and said compensation stages to form said composite signal.

14. A system for maintaining fuel pressure control in an automotive vehicle engine as set forth in claim 2 in which said clutch is an eddy current type clutch to which a control current corresponding to said output signal of said electric control is delivered to control the extent to which the clutch is allowed to slip.

* * * * *